US007086632B2

(12) United States Patent
Hsieh

(10) Patent No.: US 7,086,632 B2
(45) Date of Patent: Aug. 8, 2006

(54) KEYBOARD INSTRUMENT SUPPORT WITH ADJUSTABLE ABILITY

(76) Inventor: Wu-Hong Hsieh, No. 162, Chung Shan 2$^{nd}$ Rd., Lu Chou City, Taipei Hsien (TW)

( * ) Notice: Subject to any disclaimer, the term of this patent is extended or adjusted under 35 U.S.C. 154(b) by 104 days.

(21) Appl. No.: 10/823,826

(22) Filed: Apr. 14, 2004

(65) Prior Publication Data

US 2005/0230574 A1 Oct. 20, 2005

(51) Int. Cl.
*F16M 11/20* (2006.01)
*A47B 9/00* (2006.01)

(52) U.S. Cl. .............................. 248/188.1; 248/163.1; 108/6; 108/147

(58) Field of Classification Search ............ 248/163.1, 248/188.1, 188.2, 188.5; 108/2, 5, 6, 10, 108/147, 147.19
See application file for complete search history.

(56) References Cited

U.S. PATENT DOCUMENTS

| | | | | | |
|---|---|---|---|---|---|
| 1,927,598 | A | * | 9/1933 | Schlichter | 254/7 R |
| 3,311,337 | A | * | 3/1967 | Muller Vom Hagen | 248/188.5 |
| 3,364,881 | A | * | 1/1968 | Kooi | 108/10 |
| 4,248,161 | A | * | 2/1981 | Adair et al. | 108/6 |
| 4,469,029 | A | * | 9/1984 | Ramond | 108/3 |
| 4,726,556 | A | * | 2/1988 | Weir | 248/454 |
| 5,370,063 | A | * | 12/1994 | Childers | 108/147 |
| 5,408,940 | A | * | 4/1995 | Winchell | 108/147 |
| 5,682,825 | A | * | 11/1997 | Manner | 108/147 |
| 5,706,739 | A | * | 1/1998 | Shaheen et al. | 108/147 |
| 5,941,182 | A | * | 8/1999 | Greene | 108/147 |
| 6,019,050 | A | * | 2/2000 | Ranta | 108/6 |
| 6,378,816 | B1 | * | 4/2002 | Pfister | 248/161 |
| 6,474,246 | B1 | * | 11/2002 | Hsu | 108/147 |
| 6,484,648 | B1 | * | 11/2002 | Long | 108/147 |
| 6,578,500 | B1 | * | 6/2003 | Malizia | 108/115 |
| 6,810,820 | B1 | * | 11/2004 | Okerlund et al. | 108/147 |
| 6,857,378 | B1 | * | 2/2005 | Franze et al. | 108/147.19 |
| 6,935,250 | B1 | * | 8/2005 | Arnold | 108/147 |
| 2002/0108544 | A1 | * | 8/2002 | Hsu | 108/147.19 |

* cited by examiner

*Primary Examiner*—Anita M. King
(74) *Attorney, Agent, or Firm*—Alan D. Kamrath; Nikolai & Mersereau, P.A.

(57) ABSTRACT

A keyboard instrument support has a driving device to control upward and downward movement of inner tubes relative to the outer tubes and a ratchet device to retain the elevation of the inner tubes. The ratchet device includes a ratchet alternatively rotated by the driving device and a leverage to abut a ratchet tooth. Thus, after the inner tubes are elevated by the driving device, the abutment of the leverage to the ratchet retains the elevation of the inner tubes.

20 Claims, 8 Drawing Sheets

KEYBOARD INSTRUMENT SUPPORT WITH ADJUSTABLE ABILITY

BACKGROUND OF THE INVENTION

1. Field of the Invention

The present invention relates to a keyboard support and, more particularly, to the keyboard support which is able to adjust the height of the keyboard instrument to meet various player's needs.

2. Description of Related Art

With reference to FIG. 7, it is noted that a conventional keyboard instrument support is shown and has a pair of bases (72) engaging with the ground, a pair of outer tubes (70) respectively obliquely extending out from a distal end of the bases (72), a pair of inner tubes (701) respectively and movably received in a corresponding one of the outer tubes (70) and a pair of supporting beams (71) respectively and pivotally connected to a free end of the inner tubes (701). A first securing element (703) is provided on a side face of each outer tube (70) and has a bolt extending through the side face of the outer tube (70) to abut an outer face of the inner tube (701) by a distal free end of the bolt so that the movable movement of the inner tube (701) relative to the outer tube (70) is limited. A second securing element (731) is provided on a connection beam (73) sandwiched between the two outer tubes (70) to connect the two outer tubes (70) together. The second securing element (731) has a bolt extending through an outer face of the connection beam (73) and abut an outer face of a second inner tube slidably received inside the connection beam (73) such that the distance between the two outer tubes (70) is adjustable by screwing the second securing element (731).

When the support as shown is in application, it is noted that the securing force between the inner tubes (701) and outer tubes (70) is based on the friction between the distal end of the bolt and the outer faces of the inner tubes (701). Therefore, after the keyboard instrument is placed on top of the supporting beams (71), the weight of the keyboard instrument may overcome the frictional engagement between the bolts and the inner tubes (701), whereby the support may collapse from its telescoped height such that in the least, the keyboard will crash to the floor, and the player may even be injured.

Furthermore, when the player is trying to adjust the inner tubes (701), the player has to maintain the length of the two inner tubes (701) to be the same. Otherwise, if the support provides an inclined surface, after the keyboard instrument is placed on top of the keyboard instrument support, the keyboard instrument may slide off the support. That is, the two supporting beams (71) have to be carefully maintained horizontally at all times when the conventional keyboard instrument is placed on top of the keyboard instrument support, which is very troublesome and labor inefficient.

To overcome the shortcomings, the present invention tends to provide an improved keyboard instrument support to mitigate the aforementioned problems.

SUMMARY OF THE INVENTION

The primary objective of the present invention is to provide an improved keyboard instrument support to provide easy adjustable function to ensure that the support is able to horizontally keep the keyboard instrument at a safe, suitable and consistent height.

Another objective of the present invention is to provide a ratchet device such that when the support and keyboard instrument are being raised, the ratchet device is able to support the keyboard instrument. When the keyboard instrument is being lowered, the ratchet in the ratchet device is not driven to allow a smooth descending of the keyboard instrument.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
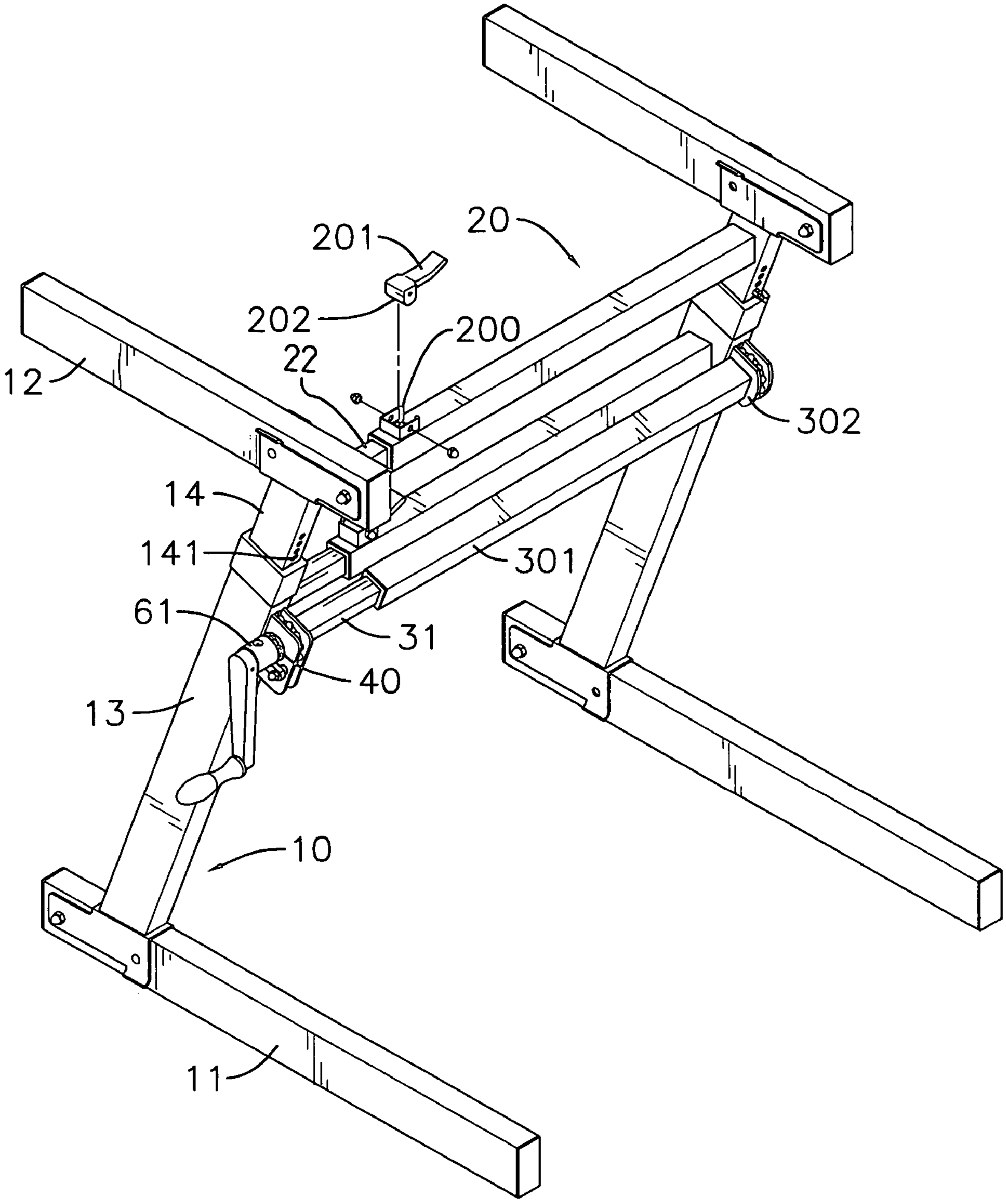
FIG. 1 is a perspective view showing the support of the present invention.

With reference to FIG. 1, the keyboard instrument support in accordance with the present invention includes a Z-shaped bracket (10) composed of two legs (11) horizontally separated from each other, two outer tubes (13) respectively and obliquely extending out from distal ends of the two legs (11), two inner tubes (14) slidably received in the two outer tubes (13) respectively and two arms (12) horizontally separated from each other and extending from free ends of the two inner tubes (14).

Two connecting tubes (20) with two sliding tubes (22) each slidably received in a corresponding one of the two connecting tubes (20) are securely connected to outer faces of one of the outer tubes (13) and one of the inner tubes (14). In this embodiment, two distal ends of the two connecting tubes (20) are connected to the outer faces of the outer tube (13) and the inner tube (14) in the same side of the support of the present invention. Distal ends of the two sliding tubes (22) are securely connected to outer faces of one of the outer tubes (13) and one of the inner tubes (14). In this embodiment, two distal ends of the two sliding tubes (22) are connected to the outer faces of the outer tube (13) and the inner tube (14) in the same side of the support of the present invention opposite to the connecting tubes (20). Each of the connecting tubes (20) is provided with pivotal plate (201) with an eccentric block (202) integrally formed with the pivotal plate (201). The eccentric block (202) is selectively extendable through a through hole (200) in the outer face of the connecting tube (20) to engage the outer face of the sliding tube (22) so as to limit the sliding movement of the sliding tubes (22) inside the connecting tubes (20).

Furthermore, each of the two outer tubes (13) is provided with a seat (40,302), namely the first seat (40) on the left side in FIG. 1 and the second seat (302) on the right side in FIG. 1. Specifically, each of the seats (40, 302) is composed of two plates and integrally formed with the outer face of each of the two outer tubes (13), a first rotation tube (301) having a closed end adjacent to the second seat (302) and an open end to slidably receive therein a second rotation tube (31) having a free end extending out of the first rotation tube (301) and adjacent to an outer face of the first seat (40).

Figure 2:
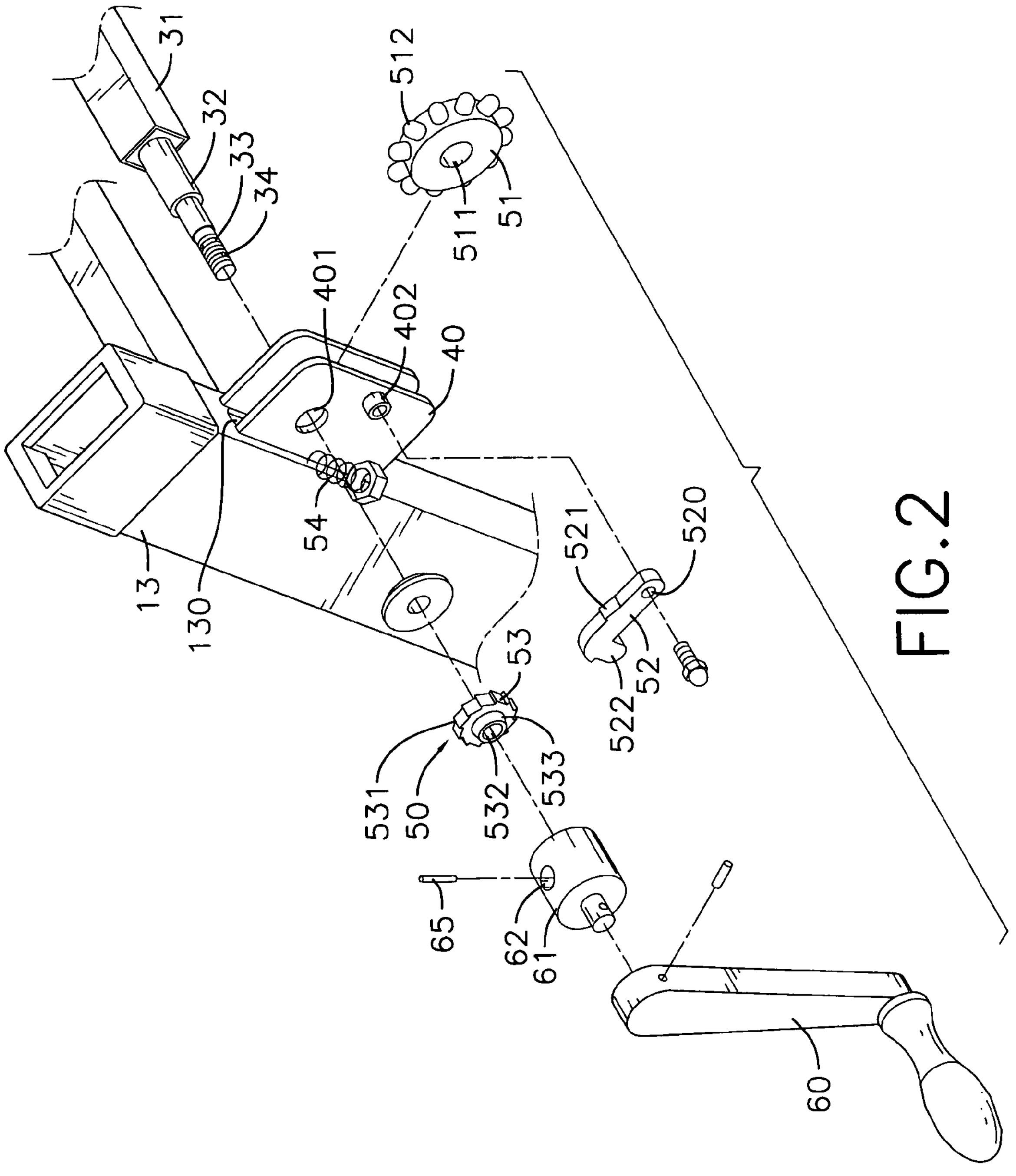
FIG. 2 is an exploded perspective view showing the ratchet device in combination with a supporting beam.

With reference to FIG. 2, the second rotation tube (31) is provided at the free end thereof with an extension (32), a threaded bolt (33) integrally formed with the free end of the extension (32) and a through hole (34) radially defined through the threaded bolt (33). A hole (130) is defined in the outer face of each of the two outer tubes (13), and the first seat (40) and second seat (302) are respectively mounted on a periphery defining the hole (130) such that the two plates of the first and second seats (40,302) are respectively on opposite sides of the hole (130) in each of the two outer tubes (13). The first seat (40) has a passage (401) defined through the two plates for rotatable receipt of extension 32 and the threaded bolt (33). A connection seat (402) is formed on an outer face of one of the two plates.

A ratchet device (50) is provided for the keyboard instrument support of the present invention to secure movement of the inner tubes (14) relative to the outer tubes (13). The ratchet device includes a roller (51), a leverage (52) and a ratchet (53). The roller (51) has an aperture (511) defined through the roller (51) to align with the passage (401) of the first seat (40) and multiple bosses (512) formed on an outer periphery of the roller (51). The leverage (52) defines a path (520) defined through the leverage (52) to receive the connection seat (402) of the first seat (40), a projection (521) formed on a top face of the leverage (52) and a finger (522) extending from a bottom face of the leverage (52). A screw (not numbered) is able to extend through the path (520) of the leverage (52) and into the connection seat (402) of the first seat (40) to secure the engagement of the leverage (52) to the first seat (40) yet still allow the leverage (52) to be pivotable relative to the first seat (40). A spring (54) has a first end securely connected to the outer face of the first seat (40) and a second end abutted to the finger (522) of the leverage (52). The ratchet (53) has multiple ratchet teeth (531) formed on an outer periphery of the ratchet (53), a pathway (532) centrally defined through the ratchet (53) to align with the passage (401) and the aperture (511) of the roller (51) such that the threaded bolt (33) of the second rotation tube (31) is able to extend through the passage (401), the aperture (511) of the roller (51) and the ratchet (53) and a first cup (533) formed on an outer face of the ratchet (53). Preferably, a washer (not numbered) is sandwiched between the outer face of the first seat (40) and the ratchet (53) to smoothen the rotation of the ratchet (53) relative to the first seat (40). A handle (60) is provided to a side of the first seat (40) and rigidly connected to a connector (61) sandwiched between the handle (60) and the ratchet (53).

Figure 4:
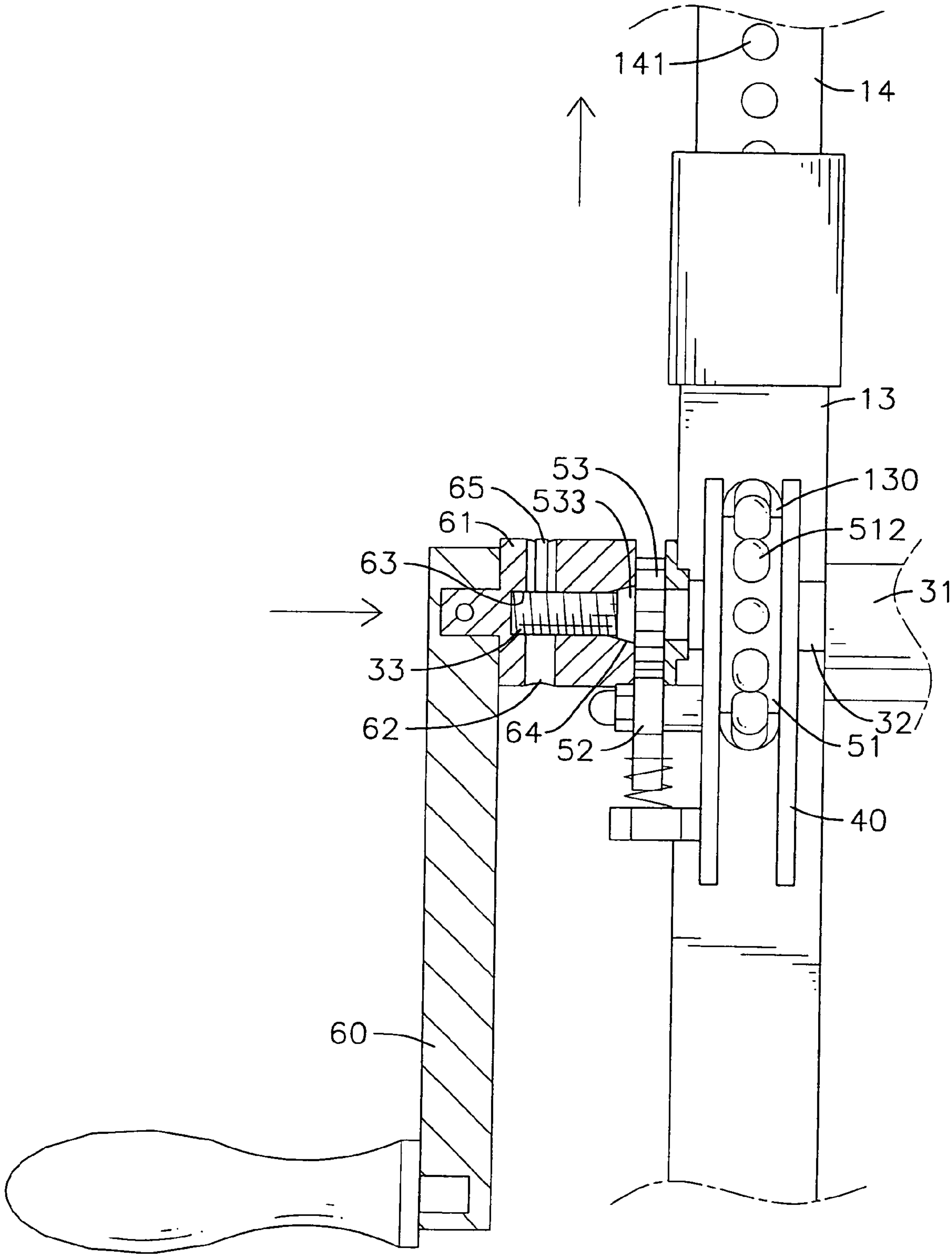
FIG. 4 is a schematic cross sectional view showing the engagement of the first cup in the connector and the second cup in the ratchet due to the rotation of the handle in a first direction.

The connector (61) has, with reference to FIG. 4, a securing hole (62) defined through the connector (61) to align with the through hole (34) of the threaded bolt (33) of the second rotation tube (31) and allow an extension of a securing pin (65) extending through the aligned through hole (34) and the securing hole (62). A threaded bore (63) defined in the connector (61) corresponds to the threaded bolt (33) of the second rotation tube (31). A second cup (64) formed on an inner face of the threaded bore (63) corresponds to the first cup (533) of the ratchet (53). It is to be noted that the cross sectional dimension of the securing hole (62) is larger than the cross sectional dimension of the securing pin (65) such that after the securing pin (65) is extended into the aligned through hole (34) and the securing hole (62), the securing pin (65) is free of engagement with an inner periphery defining the securing hole (62).

Figure 3:
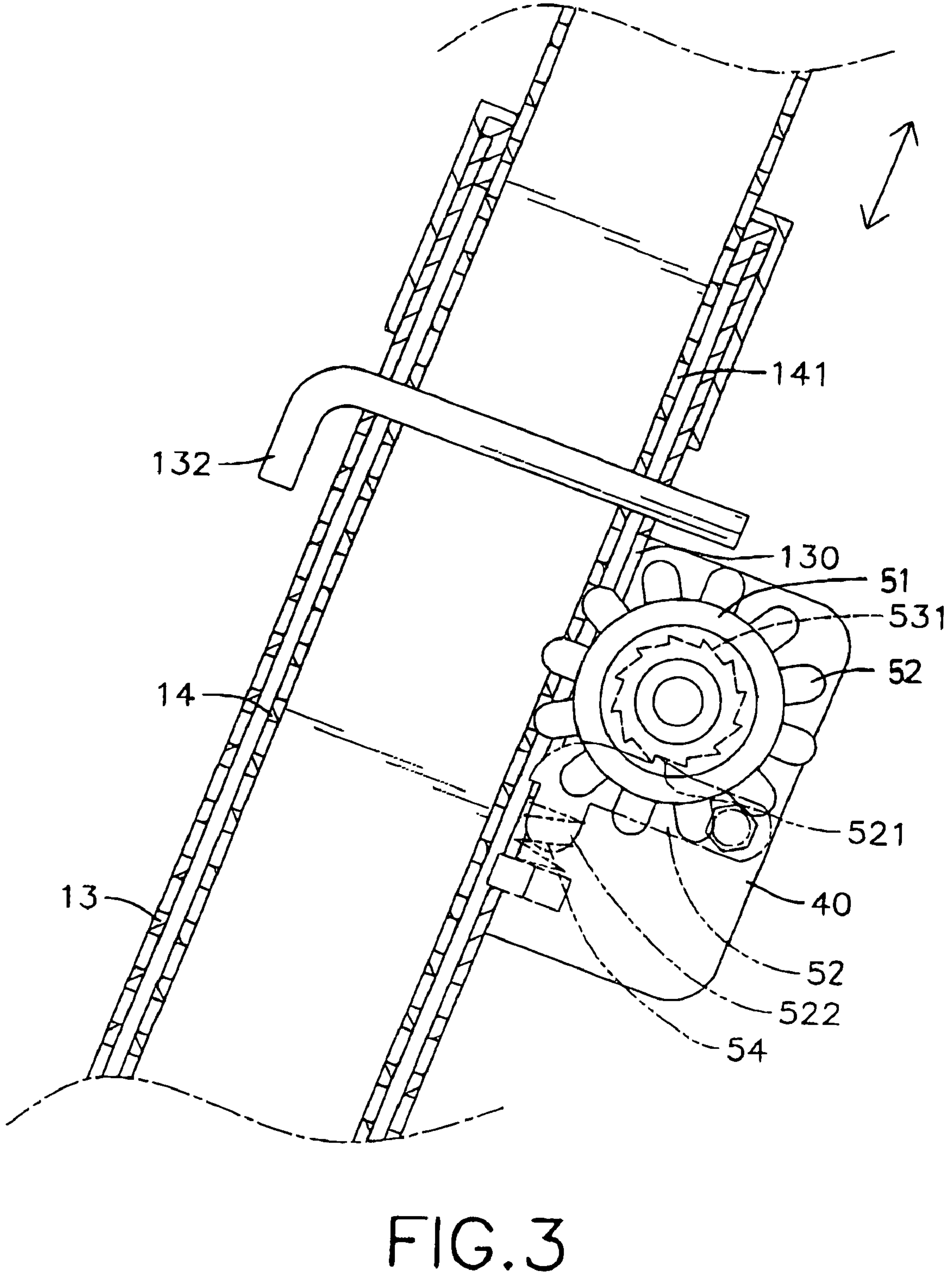
FIG. 3 is a schematic cross sectional view showing the application of the ratchet device in the supporting beam.

With reference to FIG. 3 and FIG. 4, after the present invention is assembled, it is noted that the threaded bolt (33) of the second rotation tube (31) is extended through the first seat (40), the aperture (511) of the roller (51), the washer, the pathway (532) of the ratchet (53) and into the threaded bore (63) of the connector (61) which is securely and rigidly connected to the handle (60). After the roller (51) is received in the first seat (40), the bosses (512) extend into the hole (130) of the outer tube. The projection (521) of the leverage (52) abuts a ratchet tooth (531) of the ratchet (53) and the finger (522) is securely abutted by the free end of the spring (54). Due to the abutment of the spring (54) to the finger (522), the projection (521) of the leverage (52) is so configured that the ratchet (53) can rotate in one direction only.

Meanwhile, the bosses (512) of the roller (51) extend through the hole (130) of the outer tube (13) and into one of multiple adjusting holes (141) defined through an outer periphery of the inner tube (14). A fixing element such as a limiting pin (132) is able to extend through the adjusting hole (141) of the inner tube (14) to limit movement of the inner tube (14) with respect to the outer tube (13).

Figure 4A:
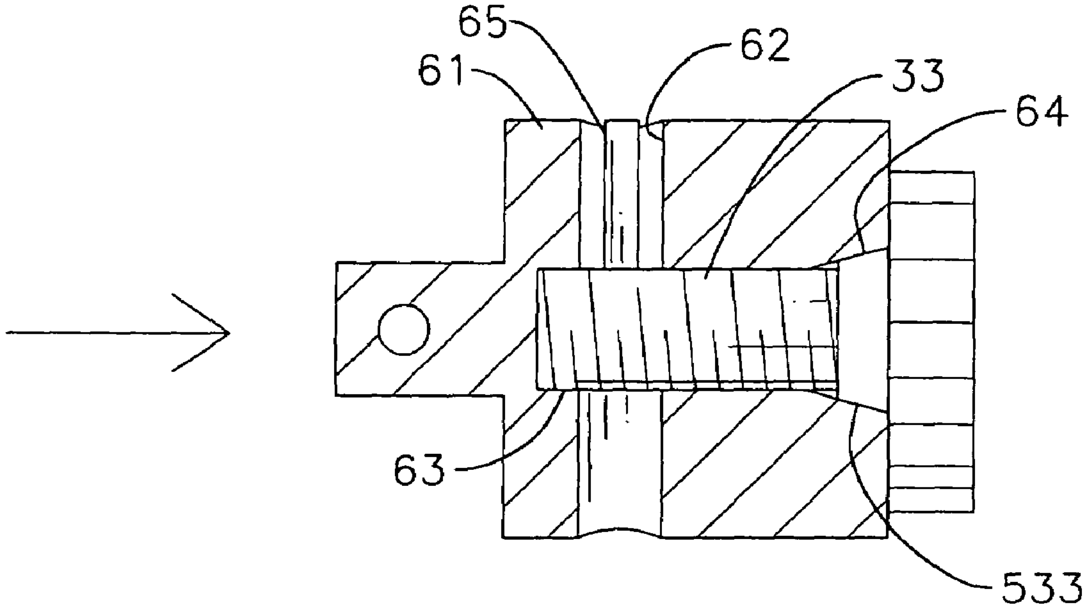
FIG. 4A is a schematic cross sectional view showing the relative relationship between the connector and the threaded bolt of the second rotation tube in the first direction.
Figure 5A:
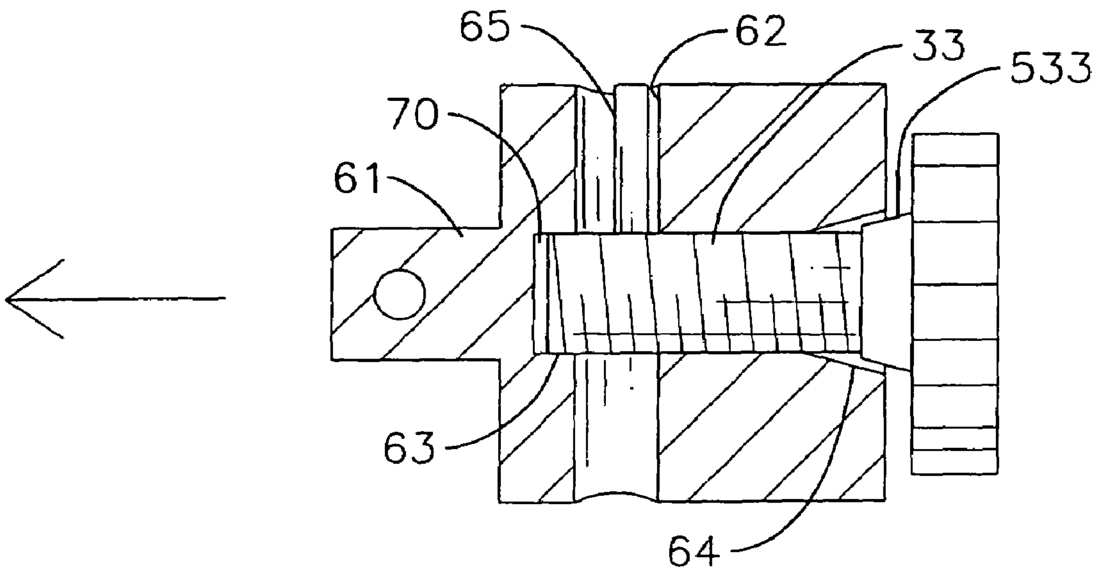
FIG. 5A is a schematic cross sectional view showing the relative relationship between the connector and the threaded bolt of the second rotation tube in the second direction.
Figure 5:
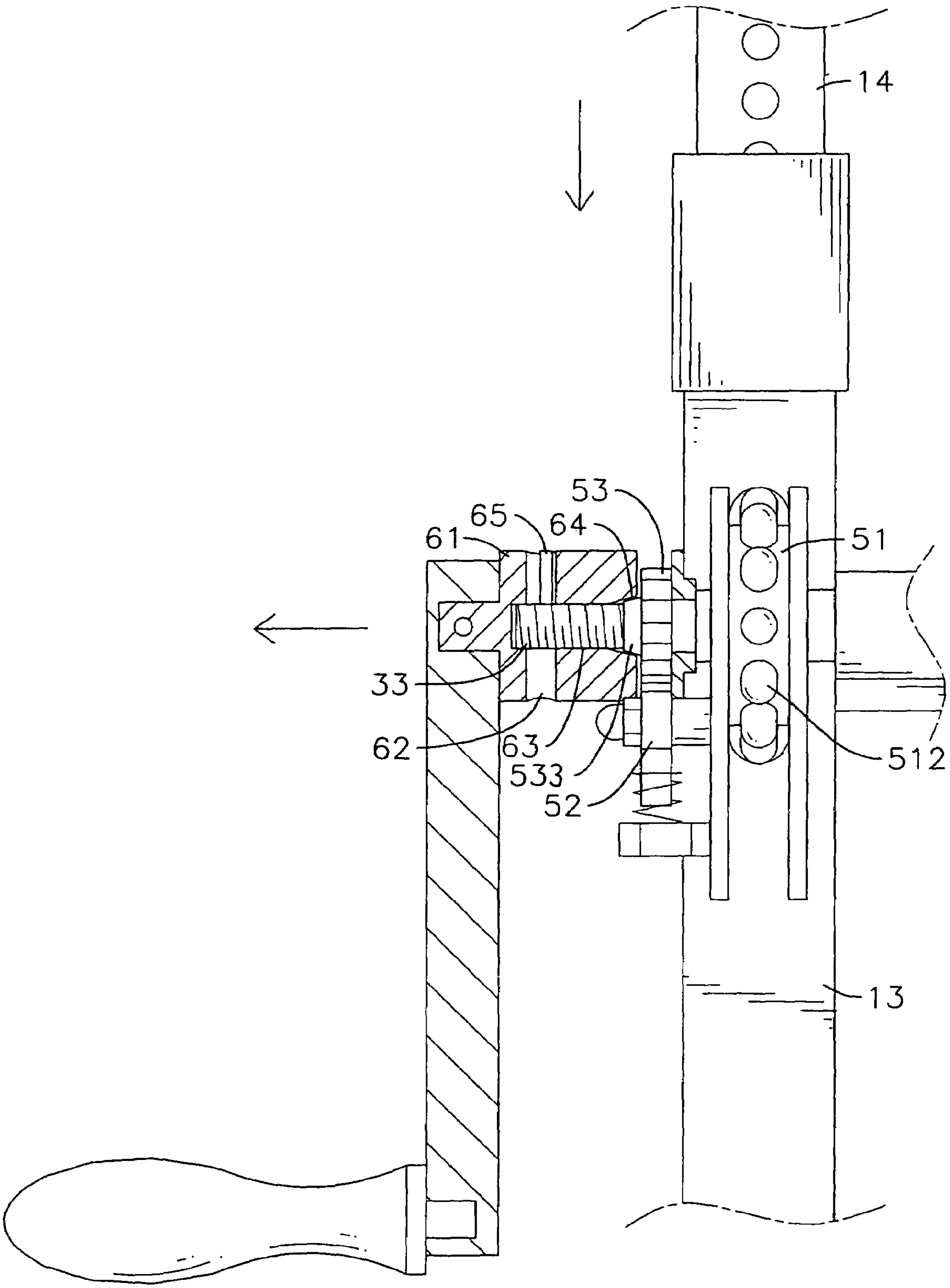
FIG. 5 is a schematic cross sectional view showing the disengagement of the first cup and the second cup due to the rotation of the handle in a second direction opposite to the first direction.

With reference to FIGS. 4, 4A, 5 and 5A, when the handle (60) is rotated in a first direction (to the right as shown in FIG. 4A by the arrow) and because the handle (60) is firmly connected to the connector (61), the rotation of the handle (60) drives the connector (61) to rotate in the same direction as that of the handle (60). Further, because of the threaded connection between the connector (61) and the threaded bolt (33) of the second rotation tube (31), the rotation of the connector (61) also drives the second rotation tube (31) to rotate in the same direction as that of the connector (61). However, before the threaded connection between the connector (61) and the threaded bolt (33) is completed, a margin is left in both the threaded bore (63) and the threaded bolt (33) such that the rotation of the connector (61) is not able to drive the second rotation tube (31) to rotate directly. Therefore, initially, when the handle (60) is started to rotate, the second rotation tube (31) is not rotated, but the threaded bolt (33) is moved deeper into the connector (61) due to the threaded connection between the threaded bolt (33) and the threaded bore (63), which tightens the connection between the threaded bolt (33) and the connector (61) and allows the securing pin (65) to abut a periphery defining the securing hole (62). In the meantime, the first cup (533) of the ratchet (53) abuts the second cup (64) of the connector (61) to create a friction therebetween. Thereafter, the rotation of the handle (60) drives the second rotation tube (31) to rotate simultaneously.

Because of the friction between the first and second cups (533,64) and the firm connection between the roller (51) and the extension (32) of the second rotation tube (31), the rotation of the handle (60) drives the roller (51) to rotate in the same direction as that of the handle (60). Therefore, when the roller (51) is rotated, the bosses (512) inserted into the adjusting holes (141) of the inner tube (14) lift the inner tube (14) relative to the outer tube (13). Furthermore, the abutment of the projection (521) to the ratchet teeth (531) ensures that the height of the inner tube (14) relative to the outer tube (13) is retained after the inner tube (13) is lifted.

When the handle (60) is rotated in a second direction opposite to the first direction (to the left side as show by the arrow in FIGS. 5 and 5A), initially, the rotation of the handle (60) releases the abutment of the securing pin (65) to the periphery defining the securing hole (62) and the engagement between the first and second cups (533,64). Thus, the ratchet (53) will not be driven by the rotation of the connector (61), and a gap (70) is defined between the threaded bolt (33) and the threaded bore (63). However, when the securing pin (65) abuts the periphery defining the securing hole (62), the rotation of the handle (60) drives the second rotation tube (31) to rotate. The rotation of the second rotation tube (31) also drives the roller (51) to rotate, which retracts the inner tube (14) inside the outer tube (13) gradually.

Figure 6:
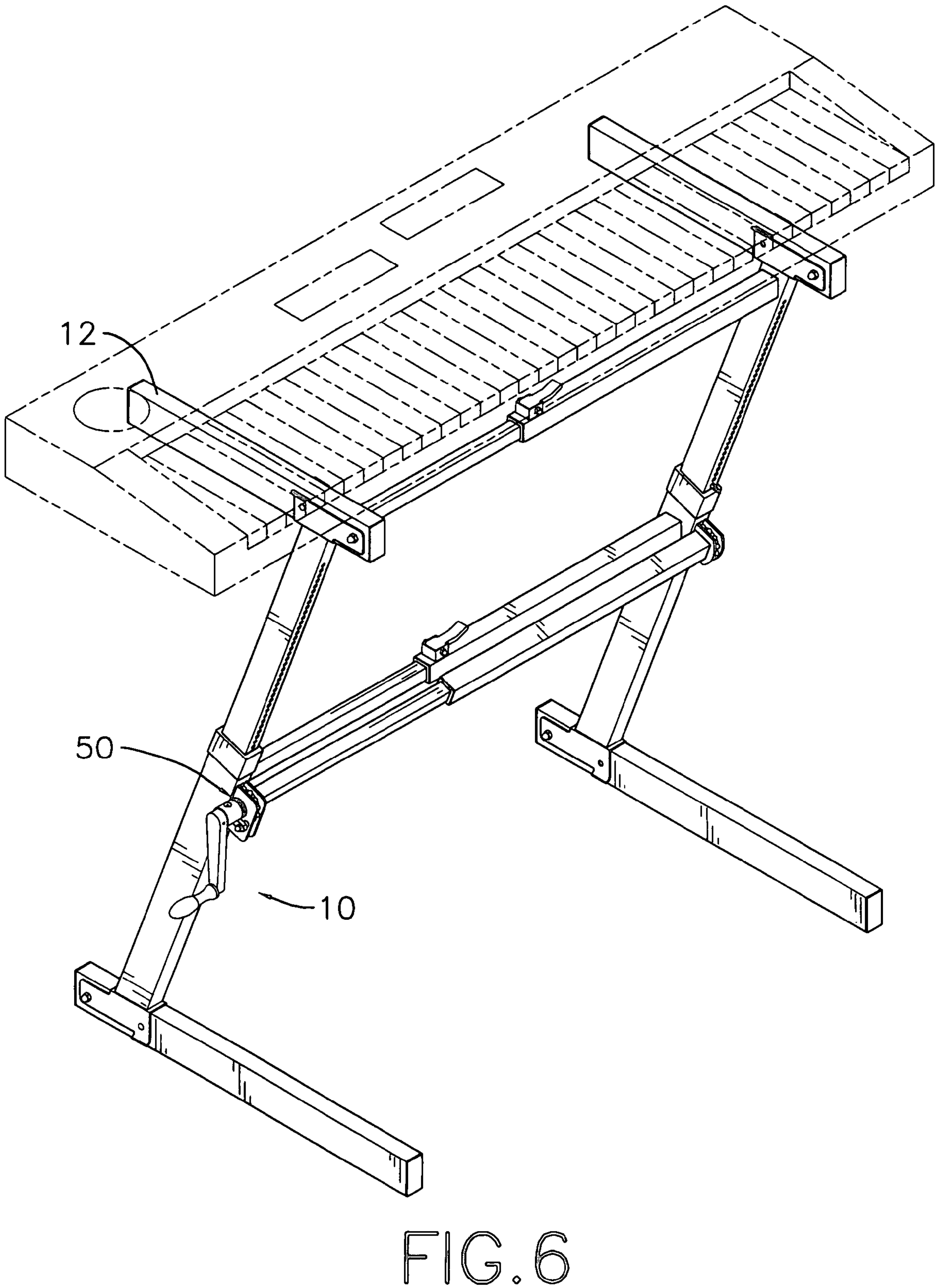
FIG. 6 is a perspective view showing the application of the keyboard instrument support with a keyboard instrument supported thereupon.
Figure 7:
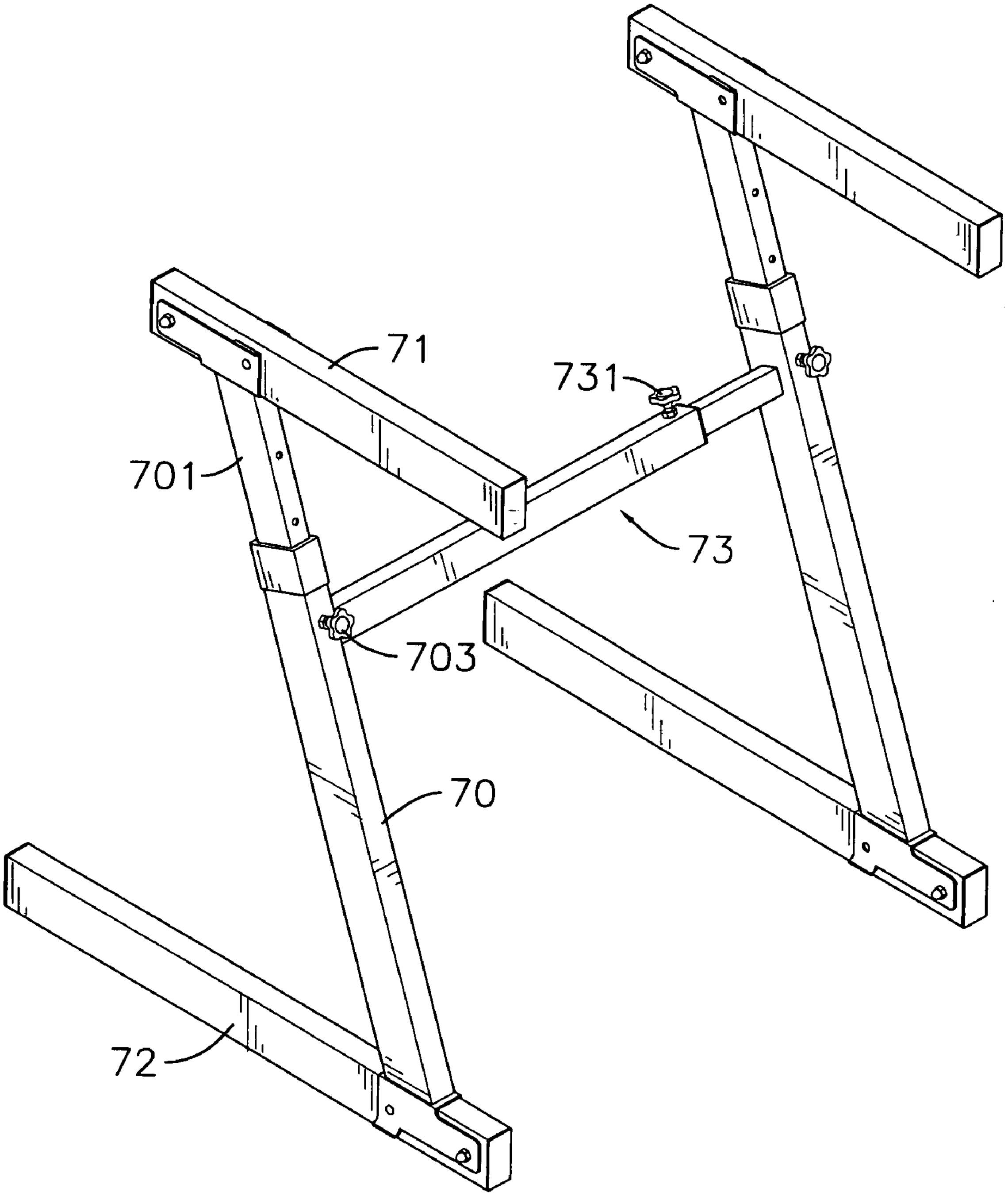
FIG.7 PRIOR ART
FIG. 7 is a perspective view showing a conventional keyboard instrument support.

Because the second rotation tube (31) drives two rollers (51), respectively, received in the first and second seats (40,302) and the two rollers (51), respectively, control the movement of an inner tube (14) on both sides of the keyboard instrument support of the present invention, the rotation of the handle (60) ensures that the movement of the two inner tubes (14) is simultaneous. Thus, the heights of the two inner tubes (14) relative to the outer tubes (13) are the same. Therefore, the keyboard instrument placed on top of the two arms (12) which are pivotally mounted on top of the inner tubes (14) for easy storage is horizontal and securely supported due to the ratchet device (50), as shown in FIG. 6.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a keyboard instrument support having two legs horizontally separated from each other, two outer tubes respectively and obliquely extending out from distal ends of the two legs, two inner tubes slidably received in the two outer tubes respectively, two arms horizontally separated from each other and extending from free ends of the two inner tubes, two connecting tubes with two sliding tubes each slidably received in a corresponding one of the two connecting tubes being securely connected to outer faces of a respective one of the outer tubes and the corresponding one of the inner tubes, wherein distal ends of the two sliding tubes are securely connected to outer faces of one of the outer tubes and one of the inner tubes and each of the connecting tubes is provided with a pivotal plate having an eccentric block integrally formed with the pivotal plate and selectively extendable through the outer face of the connecting tube to engage the outer face of the sliding tube so as to limit the sliding movement of the sliding tubes inside the connecting tubes, wherein the improvements comprise: a first seat and a second seat mounted on a corresponding one of the two outer tubes and respectively composed of two plates to rotatably receive therebetween a roller with multiple bosses formed on an outer periphery of the roller to correspond to a hole adapted to be defined in each of the outer tubes and each boss being received in one of multiple adjusting holes adapted to be defined in each of the inner tubes; a first rotation tube with a first end adjacent to an outer face of the second seat and having an open second end to securely receive therein a second rotation tube having a first end adjacent to an outer face of the first seat, with the first ends of the first and second rotation tubes integrally formed with two extensions, two threaded bolts- integrally formed with each of the extensions and respectively extending through a corresponding one of the rollers sandwiched between the first and second seats; a ratchet firmly connected to the extension of the second rotation tube and selectively rotated to drive the roller in each of the first and second seats to rotate; and means for selectively driving the ratchet to rotate such that the rotation of the roller in the first and second seats lifts or retracts the inner tubes with respect to the outer tubes and the arms are able to move simultaneously to maintain the keyboard instrument placed on top of the two arms horizontal.

2. The keyboard instrument support as claimed in claim 1, wherein the ratchet further has a leverage pivotally connected to the first seat and having a projection formed on a top face of the leverage to abut a ratchet tooth of the ratchet so as to limit the rotation of the ratchet.

3. The keyboard instrument support as claimed in claim 2, wherein the leverage has a finger extending from a bottom face of the leverage to abut a first end of a spring of which a second end is securely connected to the outer face of the first seat so that the spring is able to provide a resilient force to the leverage to maintain the abutment of the projection to the ratchet tooth of the ratchet and thus the rotation of the ratchet is limited.

4. The keyboard instrument support as claimed in claim 1, wherein the driving means comprises a handle and a connector sandwiched between the handle and the ratchet to allow the threaded bolt to extend into the connector after extending through the first and second seats, the rollers respectively received in the first and second seats and the ratchet alternatively rotated beside the outer face of the first seat.

5. The keyboard instrument support as claimed in claim 3, wherein the driving means comprises a handle and a connector sandwiched between the handle and the ratchet to allow the threaded bolt to extend into the connector after extending through the first and second seats, the rollers respectively received in the first and second seats and the ratchet alternatively rotated beside the outer face of the first seat.

6. The keyboard instrument support as claimed in claim 5, wherein the connector has a securing hole defined through the connector to align with a through hole defined in the threaded bolt and allow a securing pin to extend through the securing hole and into the through hole to secure engagement between the connector and the threaded bolt.

7. The keyboard instrument support as claimed in claim 6, wherein the securing hole has a dimension larger than a dimension of the securing pin such that the securing pin is distant from a periphery defining the securing hole and the connector has a threaded bore defined in the connector to threadingly receive therein the threaded bolt of the second rotation tube such that when the handle is rotated in a first direction to drive the connector to rotate in the same direction as that of the handle, a free end of the threaded bolt at a first position is moved to a second position where the ratchet is driven to rotate by the connector and the roller is rotated to lift the inner tube relative to the outer tube.

8. The keyboard instrument support as claimed in claim 7, wherein the securing pin abuts the periphery defining the securing hole when the free end of the threaded bolt is moved to the second position such that the rotation of the handle is able to drive the ratchet to rotate in the first direction.

9. The keyboard instrument support as claimed in claim 7, wherein a gap is defined between the free end of the threaded bolt and a bottom face of the threaded bore when the handle is rotated in a second direction opposite to the first direction to drive the free end at the second position to the first position where the ratchet is released from rotation and the inner tube is retracted inside the outer tube.

10. The keyboard instrument support as claimed in claim 8, wherein a gap is defined between the free end of the threaded bolt and a bottom face of the threaded bore when the handle is rotated in a second direction opposite to the first direction to drive the free end at the second position to the first position where the ratchet is released from rotation and the inner tube is retracted inside the outer tube.

11. The keyboard instrument support as claimed in claim 10, wherein the ratchet has a first cup formed on an outer face of the ratchet and the connector has a second cup formed on the inner face of the threaded bore to correspond to and engage with the first cup when the free end of the threaded bolt is moved from the first position to the second position and disengage with the first cup when the free end of the threaded bolt is moved from the second position to the first position.

12. A keyboard instrument support comprising: two Z-shaped brackets with a distance apart from each other; at least one connecting tube connecting the two brackets together and having a sliding tube slidably received in the connecting tube to adjust the distance between the two brackets, wherein each bracket has an outer tube and an inner tube slidably received in and extending out of the outer tube; a first seat and a second seat mounted on a corresponding one of the two outer tubes and respectively composed of two plates to rotatably receive therebetween a roller with multiple bosses formed on an outer periphery of the roller to correspond to a hole adapted to be defined in each of the outer tubes and each boss being received in one of multiple adjusting holes defined in each of the inner tubes; a first rotation tube with a first end adjacent to an outer face of one plate of the second seat and an open second end to slidably receive therein a second rotation tube having a first end adjacent to an outer face of the first seat, with the first ends of the first and second rotation tubes integrally formed with two extensions, two threaded bolts integrally formed with the two extensions and extending through the rollers sandwiched between the first and second seats; means for ratcheting elevation of the inner tubes relative to the outer tubes; and means for alternatively driving the ratcheting means to rotate such that the rotation of the rollers in the first and second seats lifts or retracts the inner tubes with respect to the outer tubes and two arms are able to move simultaneously to maintain the keyboard instrument placed on top of the two arms horizontal.

13. The keyboard instrument support as claimed in claim 12, wherein the ratcheting means comprises: a ratchet alternatively rotated in a first direction to elevate the inner tube relative to the outer tube and having multiple ratcheting teeth formed on an outer periphery of the ratchet; a leverage pivotally connected to the outer face of the first seat and having a projection formed on a top face of the leverage to correspond to and abut a corresponding one of the ratcheting teeth to limit the rotation movement of the ratchet; and a spring having a first end securely connected to the outer face of the first seat and a second end abutted to a finger extending downward from the leverage so that the leverage is able to maintain abutting the ratchet.

14. The keyboard instrument support as claimed in claim 12, wherein the driving means comprises a handle and a connector sandwiched between the handle and the ratchet to allow the threaded bolt to extend into the connector after extending through the first and second seats, the rollers respectively received in the first and second seats and the ratchet alternatively rotated beside the outer face of the first seat.

15. The keyboard instrument support as claimed in claim 14, wherein the connector has a securing hole defined through the connector to align with a through hole defined in the threaded bolt and allow a securing pin to extend through the securing hole and into the through hole to secure engagement between the connector and the threaded bolt.

16. The keyboard instrument support as claimed in claim 15, wherein the securing hole has a dimension larger than a dimension of the securing pin such that the securing pin is distant from a periphery defining the securing hole and the connector has a threaded bore defined in the connector to threadingly receive therein the threaded bolt of the second rotation tube such that when the handle is rotated in a first direction to drive the connector to rotate in the same direction as that of the handle, a free end of the threaded bolt at a first position is moved to a second position wherein the ratchet is driven to rotate by the connector and the roller is rotated to lift the inner tube relative to the outer tube.

17. The keyboard instrument support as claimed in claim 16, wherein the securing pin abuts the periphery defining the securing hole when the free end of the threaded bolt is moved to the second position such that the rotation of the handle is able to drive the ratchet to rotate in the first direction.

18. The keyboard instrument support as claimed in claim 16, wherein a gap is defined between the free end of the threaded bolt and a bottom face of the threaded bore when the handle is rotated in a second direction opposite to the first direction to drive the free end at the second position to the first position where the ratchet is released from rotation and the inner tube is retracted inside the outer tube.

19. The keyboard instrument support as claimed in claim 17, wherein a gap is defined between the free end of the threaded bolt and a bottom face of the threaded bore when the handle is rotated in a second direction opposite to the first direction to drive the free end at the second position to the first position where the ratchet is released from rotation and the inner tube is retracted inside the outer tube.

20. The keyboard instrument support as claimed in claim 19, wherein the ratchet has a first cup formed on an outer face of the ratchet and the connector has a second cup formed on the inner face of the threaded bore to correspond to and engage with the first cup when the free end of the threaded bolt is moved from the first position to the second position and disengages with the first cup when the free end of the threaded bolt is moved from the second position to the first position.

* * * * *